United States Patent
Yasuda

(10) Patent No.: US 9,632,309 B2
(45) Date of Patent: Apr. 25, 2017

(54) PIEZOELECTRIC AND ELECTROMAGNETIC TYPE TWO-DIMENSIONAL OPTICAL DEFLECTOR AND ITS MANUFACTURING METHOD

(71) Applicant: STANLEY ELECTRIC CO., LTD., Meguro-ku, Tokyo (JP)

(72) Inventor: Yoshiaki Yasuda, Yokohama (JP)

(73) Assignee: STANLEY ELECTRIC CO., LTD., Tokyo (JP)

(*) Notice: Subject to any disclaimer, the term of this patent is extended or adjusted under 35 U.S.C. 154(b) by 26 days.

(21) Appl. No.: 14/882,888

(22) Filed: Oct. 14, 2015

(65) Prior Publication Data

US 2016/0116732 A1 Apr. 28, 2016

(30) Foreign Application Priority Data

Oct. 23, 2014 (JP) ................. 2014-216693

(51) Int. Cl.
*G02B 26/08* (2006.01)
*G02B 26/10* (2006.01)
*G09G 3/02* (2006.01)

(52) U.S. Cl.
CPC ....... *G02B 26/0858* (2013.01); *G02B 26/085* (2013.01); *G02B 26/101* (2013.01); *G02B 26/105* (2013.01); *G09G 3/025* (2013.01)

(58) Field of Classification Search
CPC G02B 26/085; G02B 26/0858; G02B 26/105; G02B 26/101; G09G 3/025
USPC ..................... 359/199.3–199.4, 200.7–200.8, 359/224.1–224.2
See application file for complete search history.

(56) References Cited

U.S. PATENT DOCUMENTS

| 2011/0063702 A1 | 3/2011 | Takeda | |
| 2014/0104840 A1* | 4/2014 | Iseki | G02B 26/0858 362/259 |
| 2015/0294609 A1* | 10/2015 | Ohyama | G02B 26/085 345/697 |

FOREIGN PATENT DOCUMENTS

| DE | 102007027428 A1 | 12/2008 |
| JP | 2008040240 A | 2/2008 |
| JP | 2009258645 A | 11/2009 |
| JP | 2011064928 A | 3/2011 |
| WO | 2013121774 A1 | 8/2013 |

OTHER PUBLICATIONS

Extended European Search Report dated Mar. 16, 2016, issued in counterpart European Application No. 15190945.4.

* cited by examiner

*Primary Examiner* — James Phan
(74) *Attorney, Agent, or Firm* — Holtz, Holtz & Volek PC

(57) ABSTRACT

In a two-dimensional optical deflector including: a mirror; two first torsion bars coupled to the mirror along a first axis; an inner frame surrounding the mirror; two piezoelectric actuators each coupled between the first torsion bars and supported by the inner frame; an outer frame surrounding the inner frame; and two second torsion bars coupled between the inner frame and the outer frame along a second axis; a first permanent magnet layer formed on at least a part of a rear-side surface of the inner frame. A base supports the outer frame. A coil is formed at the base. A magnetic flux generated from the coil interacts with a magnetic flux of the first permanent magnetic layer.

20 Claims, 17 Drawing Sheets

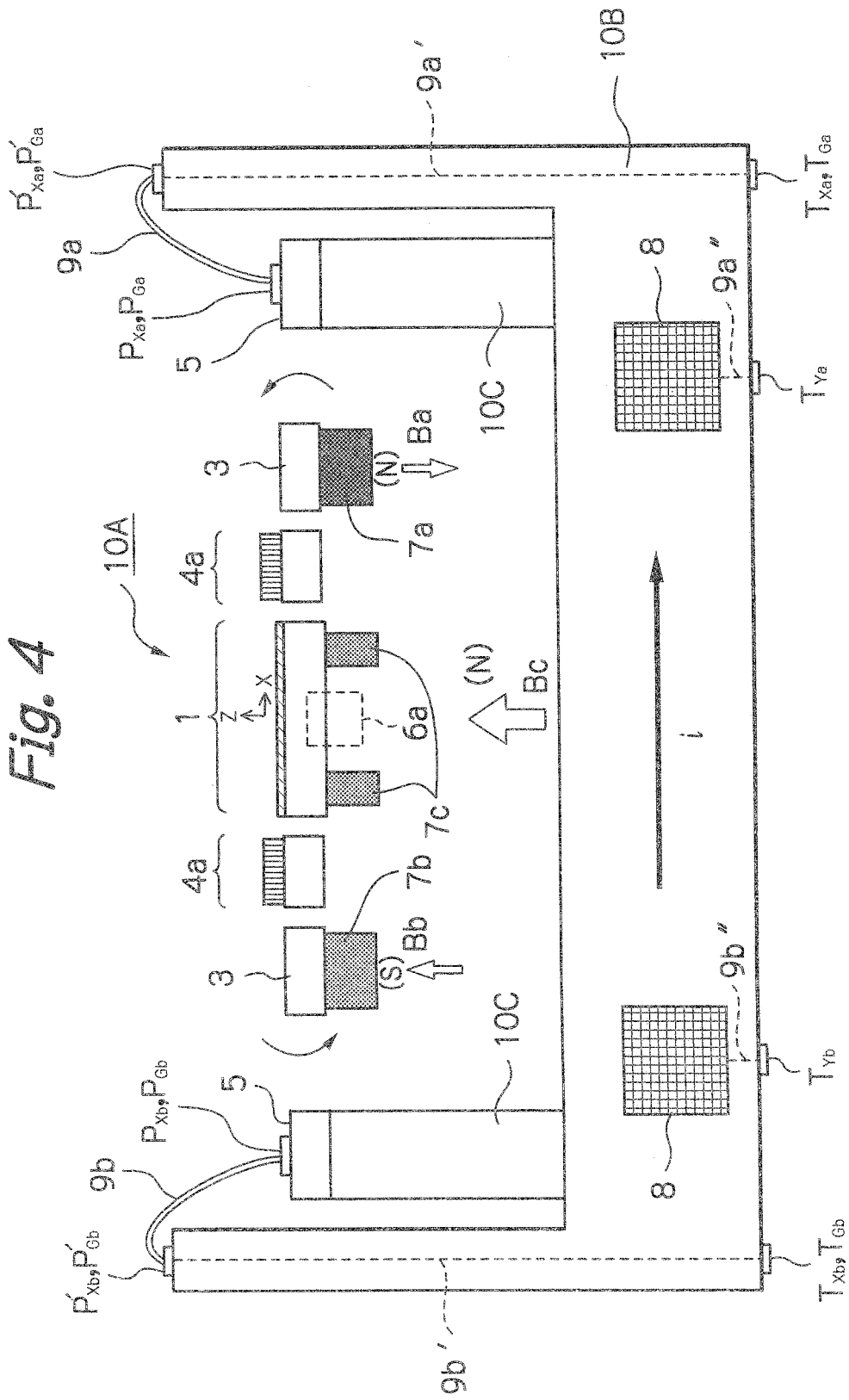

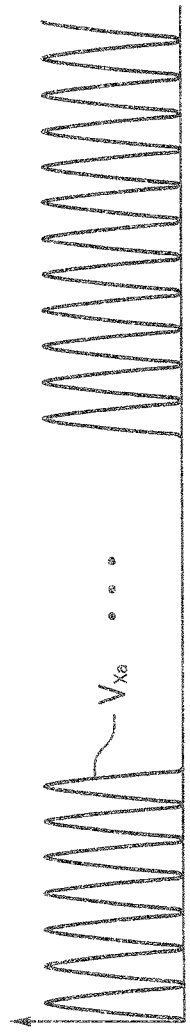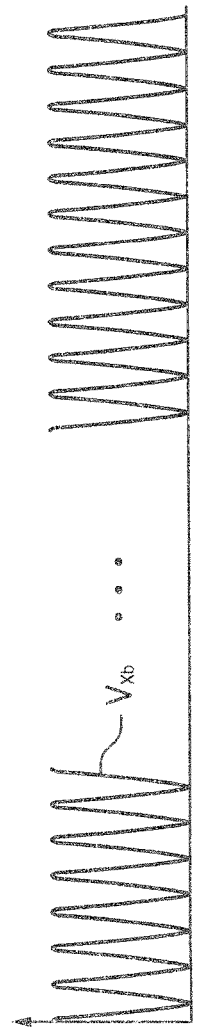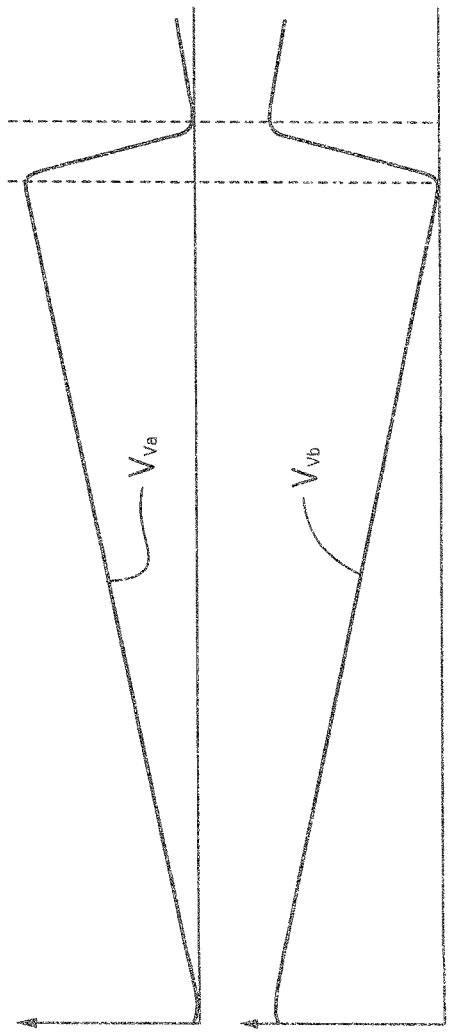
Fig. 5A  Fig. 5B  Fig. 5C  Fig. 5D

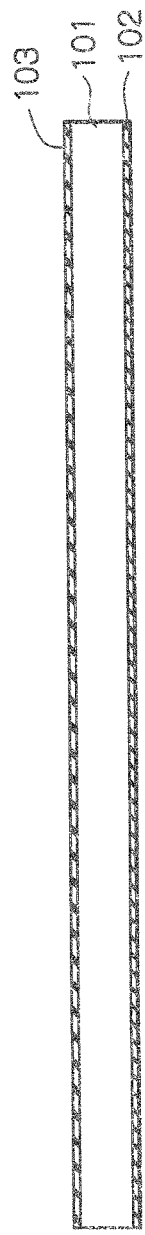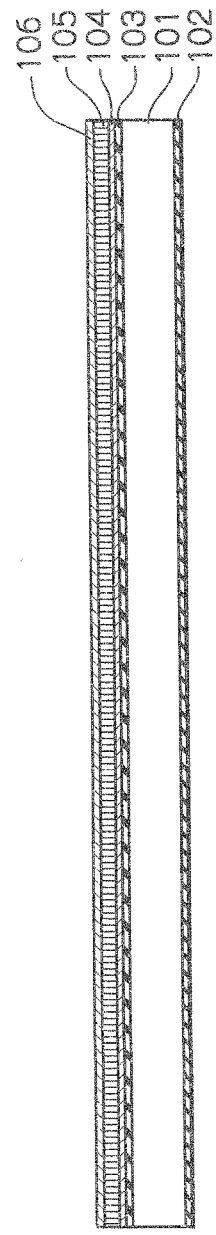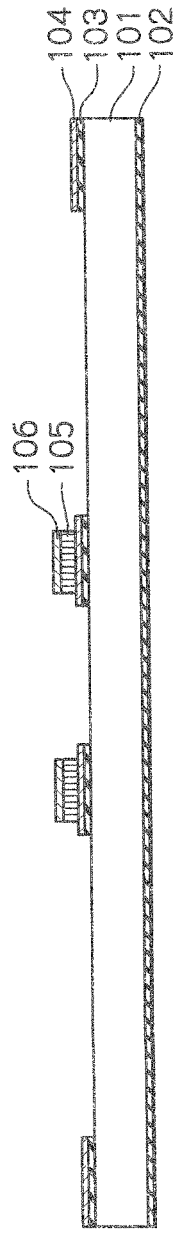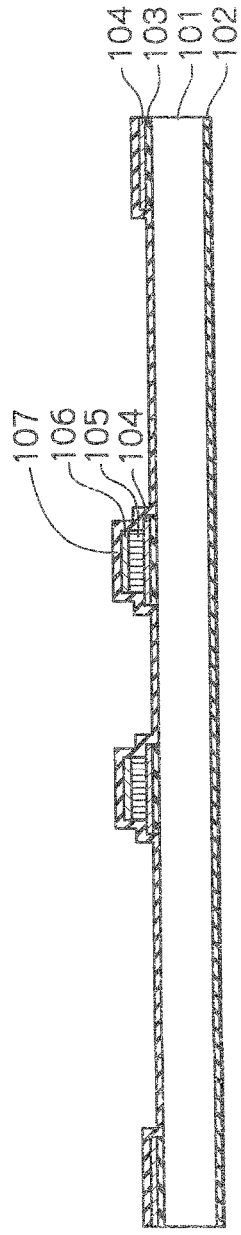
Fig. 11A
Fig. 11B
Fig. 11C
Fig. 11D

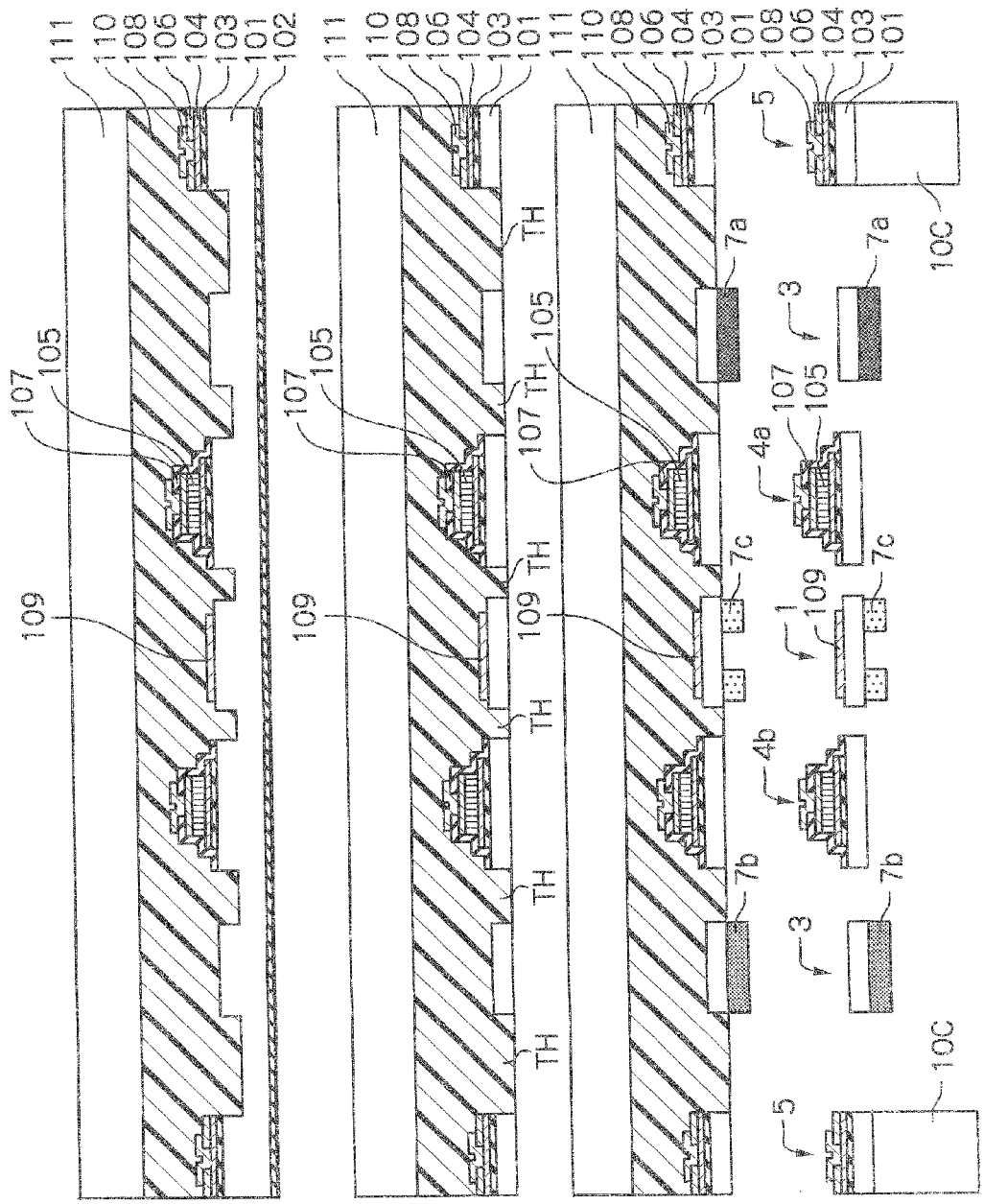

PIEZOELECTRIC AND ELECTROMAGNETIC TYPE TWO-DIMENSIONAL OPTICAL DEFLECTOR AND ITS MANUFACTURING METHOD

This application claims the priority benefit under 35 U.S.C. §119 to Japanese Patent Application No. JP2014-216693 filed on Oct. 23, 2014, which disclosure is hereby incorporated in its entirety by reference.

BACKGROUND

Field

The presently disclosed subject matter relates to a two-dimensional optical deflector. The optical deflector can be applied as an optical scanner to a laser, pico projector, a laser radar, a bar code reader, an area sensor, an adaptive driving beam (ADB) type head lamp, a head-up display (HUD) unit, and other optical apparatuses, to generate scanning light.

Description of the Related Art

Generally, in an optical scanner or the like, a two-dimensional optical deflector is constructed by a micro electro mechanical system (MEMS) device manufactured by using semiconductor manufacturing processes and micro machine technology.

A two-dimensional optical deflector can be constructed by simply combining two one-dimensional optical deflectors each with one mirror; however, in this case, since laser light is reflected twice, once by each mirror, the utilization of laser light is low and the size is large. Therefore, a two-dimensional optical deflector has been constructed by only one mirror, in order to increase the light utilization efficiency of laser beam and reduce the size.

A first prior art two-dimensional optical deflector with only one mirror has two of the same kinds of piezoelectric actuators (see: FIG. 19 of JP2008-40240A). In more detail, this two-dimensional optical deflector is constructed by a mirror, a pair of torsion bars coupled to the mirror along an axis (X-axis), an inner frame (movable frame) surrounding the mirror and the torsion bars, inner piezoelectric actuators coupled between the torsion bars and supported by the inner frame via inner coupling portions, serving as cantilevers for rocking the mirror with respect to the X-axis of the mirror, an outer frame (fixed frame) surrounding the inner frame, and outer piezoelectric actuators of a meandering-type coupled between the inner frame and the outer frame, serving as cantilevers for rocking the mirror along another axis (Y-axis) of the mirror.

In the above-described first prior art two-dimensional optical deflector, the inner piezoelectric actuators are driven by a drive voltage such as 10 V at a relatively high resonant frequency such as 25 kHz for a horizontal scanning, while the outer piezoelectric actuators are driven by a relatively high drive voltage such as 60 V at a relatively low non-resonant frequency such as 60 Hz for a vertical scanning. Thus, a piezoelectric driving method is used for both of the horizontal scanning and the vertical scanning.

In the above-described first prior art two-dimensional optical deflector; however, in order to enhance the resolution of projected images, the high frequency for a horizontal scanning has to be increased to 30 kHz or more, so that it is difficult to make the resonant frequency compatible with the non-resonant frequency. Also, in this case, in order to suppress the dynamic deformation of the mirror and the spurious vibration of the piezoelectric actuators, the mechanical rigidity of the optical deflector has to be increased. Further, the drive voltage for the vertical scanning is very high.

Particularly, when the outer piezoelectric actuators are of a meandering-type, the vibration mode of the inner piezoelectric actuators and the vibration mode of the outer piezoelectric actuators easily interact with each other, so that it is difficult to maintain the flexing angle of the mirror by the non-resonant frequency while suppressing the mode interaction. Further, the optimum thickness of the mirror is different from that of the meandering-type outer piezoelectric actuators.

A second prior art two-dimensional optical deflector with only one mirror has two different-kinds of actuators: piezoelectric actuators and electromagnetic actuators (see: JP2011-64928A & US2011/0063702A1). In more detail, this two-dimensional optical deflector is constructed by a movable body and a base for supporting the movable body. The movable body is constructed by a mirror, a pair of first torsion bars coupled to the mirror along an axis (X-axis), an inner frame (first movable frame) surrounding the mirror and the first torsion bars, an outer frame (second movable frame) surrounding the inner frame, piezoelectric actuators coupled between the inner frame and the outer frame, serving as cantilevers for rocking the mirror with respect to the X-axis of the mirror, a pair of second torsion bars coupled between the outer frame and the base along another axis (Y-axis) of the mirror, and a coil provided on the rear surface of the outer frame. On the other hand, the base has a recess portion in which a permanent magnet surrounded by a pair of yokes is provided. The movable body is bonded to the base, so that the movable body can be rocked along the X-axis and the Y-axis of the mirror.

In the second prior art two-dimensional optical deflector, the piezoelectric actuators are driven by a drive voltage such as 10 V at a relatively high resonant frequency such as 25 kHz for a horizontal scanning. Thus, a piezoelectric driving method is used for the horizontal scanning. Contrary to this, when a current is supplied to the coil, Lorentz forces are generated between the current and a magnetic field generated between the yokes of the permanent magnet (see: FIG. 7 of JP2011-64928A & US2011/0063702A1), the mirror is rocked along the Y-axis. The current is driven by a relatively low drive voltage at a relatively low non-resonant frequency such as 60 Hz for a vertical scanning. Thus, an electromagnetic driving method is used for the vertical scanning. In this case, since the Lorentz forces are very large, the flexing angle of the mirror can be large even at the low non-resonant frequency.

In the above-described second prior art two-dimensional optical deflector; however, in order to increase the Lorentz forces, both of the outer frame on which the coil is formed and the permanent magnet have to be increased in size, Which would increase the optical deflector in size.

SUMMARY

The presently disclosed subject matter seeks to solve the above-described problems.

According to the presently disclosed subject matter, in a two-dimensional optical deflector including: a mirror; two first torsion bars coupled to the mirror along a first axis; an inner frame surrounding the mirror and the first torsion bars; two piezoelectric actuators each coupled between the first torsion bars and supported by an inner coupling portion of the inner frame, adapted to rock the mirror around the first axis; an outer frame surrounding the inner frame; and two second torsion bars coupled between the inner frame and the outer frame along a second axis; a first permanent magnet layer is formed on at least a part of a rear-side surface of the inner frame. A base supports a rear-side surface of the outer frame. A coil is formed at the base opposing the first permanent magnet layer. A magnetic flux generated from the coil interacts with a magnetic flux of the first permanent magnetic layer to rock the mirror around the second axis.

Also, in a method for manufacturing a two-dimensional optical deflector including; forming a mirror, two first torsion bars coupled to the mirror along a first axis, an inner frame surrounding the mirror and the first torsion. bars, two piezoelectric actuators each coupled between the first torsion bars and supported by an inner coupling portion of the inner frame, adapted to rock the mirror around the first axis, an outer frame surrounding the inner frame, and two second torsion bars coupled between the inner frame and the outer frame along a second axis, using a monocrystalline silicon substrate; the method includes forming a first magnetic layer on a rear-side surface of the inner frame; performing a first magnetizing process upon at least a first part of the first magnetic layer to form a first permanent magnet layer; and adhering a rear-side surface of the outer frame onto a base including a coil opposing the permanent magnet layer. A magnetic flux generated from the coil interacts with a magnetic flux of the first permanent magnetic layer to rock the mirror around the second axis.

According to the presently disclosed subject matter, since the permanent magnet layer is provided on the rear-side surface of the inner frame and the coil is provided at the base, the optical deflector can be decreased in size.

BRIEF DESCRIPTION OF THE DRAWINGS

The above and other advantages and features of the presently disclosed subject matter will be more apparent from the following description of certain embodiments, taken in conjunction with the accompanying drawings, wherein:

FIG. 4 is a cross-sectional view taken along the line IV-IV in FIGS. 2A and 2B where the movable body of FIG. 2A is bonded onto the package of FIG. 2B;

FIGS. 5A through 5D are timing diagrams of the drive voltages supplied to the optical deflector of FIG. 1;

FIGS. 11A through 11L are cross-sectional views for explaining a method for manufacturing the two-dimensional optical deflector of FIG. 1.

DETAILED DESCRIPTION OF EXEMPLARY EMBODIMENTS

Figure 1:
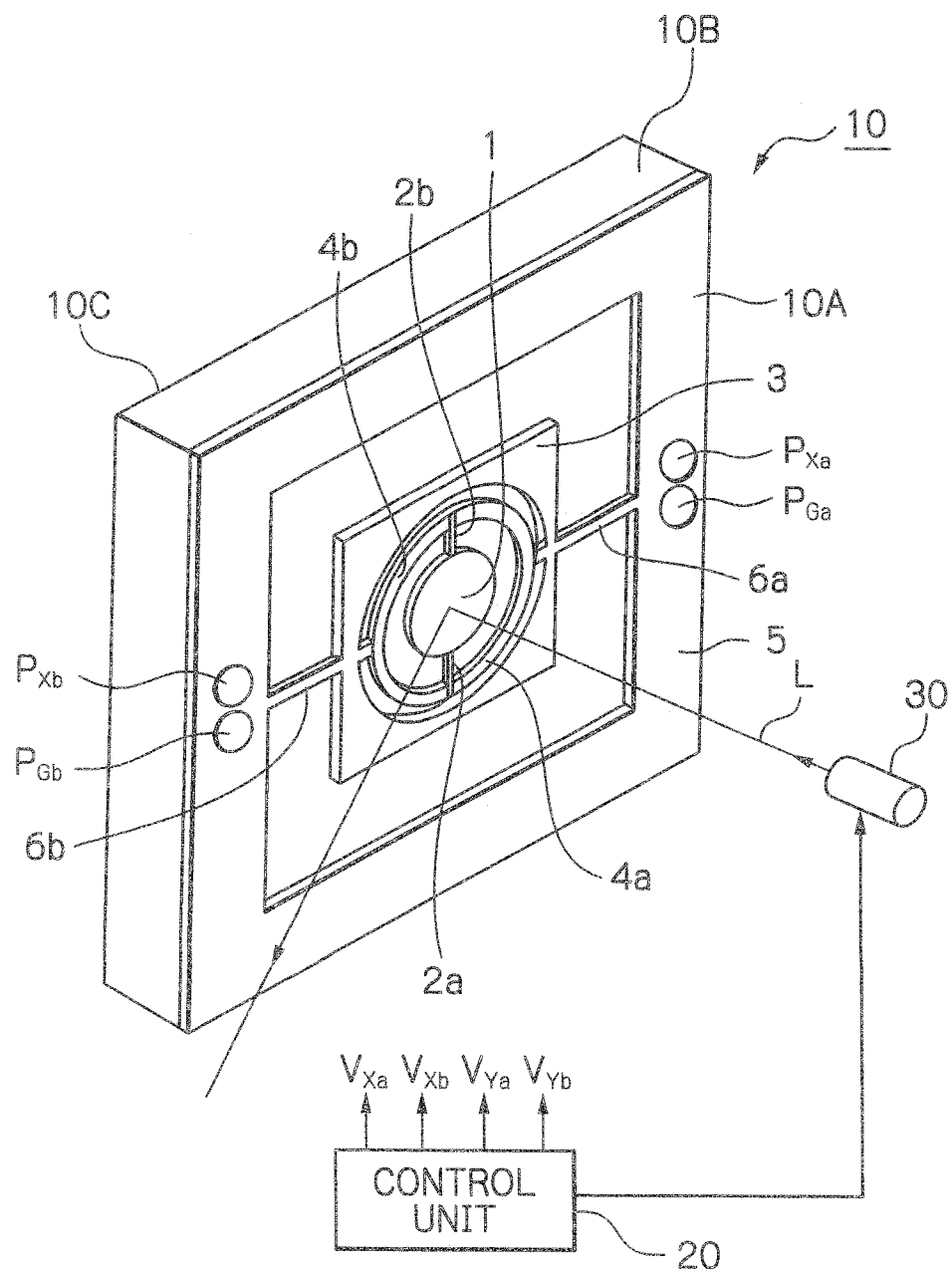
FIG. 1 is a front-side perspective view illustrating an optical scanner including a first embodiment of the two-dimensional optical deflector according to the presently disclosed subject matter.

In FIG. 1, which illustrates an optical scanner including a first embodiment of the two-dimensional optical deflector according to the presently disclosed subject matter, reference numeral 10 designates a two-dimensional optical deflector, 20 designates a control unit for controlling the optical deflector 10 by drive voltages $V_{Xa}$, $V_{Xb}$, $V_{Ya}$ and $V_{Yb}$, and 30 designates a laser light source. The two-dimensional optical deflector 10 is constructed by a movable body 10A, a package 10B serving as a base for supporting the movable body 10A, and a spacer 10C interposed between the movable body 10A and the package 10B. The laser light source 30 is turned on and off by the control unit 20 which also controls the brightness of the laser light source 30.

The control unit 20 is constructed by a control circuit such as a microcomputer including a central processing unit (CPU), a field programmable gate array (FPGA), a read-only memory (ROM) or a nonvolatile memory, a random access memory (RAM), an input/output (I/O) interface and the like.

Figure 2A:
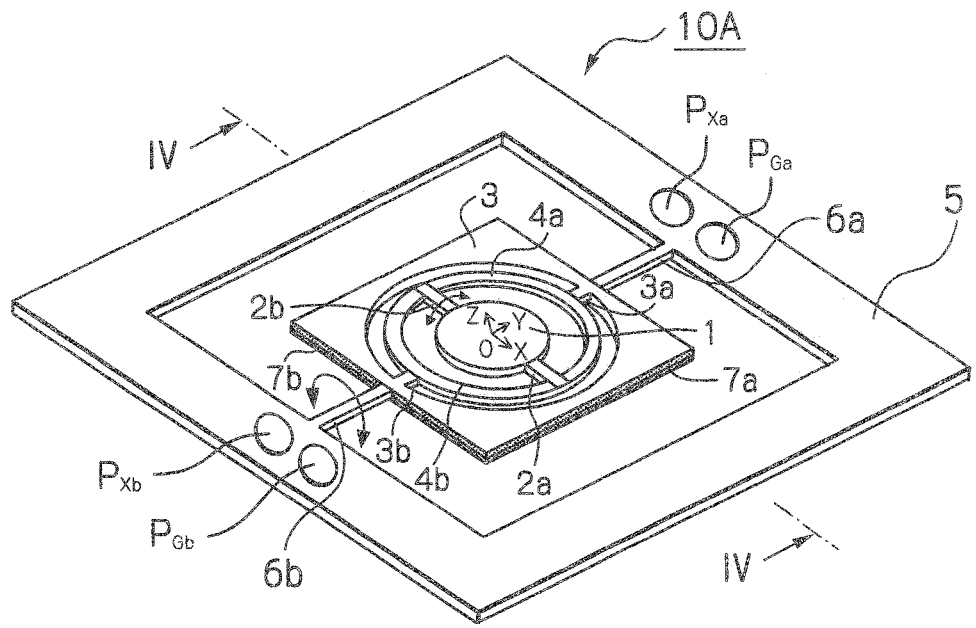
FIG. 2A is a front-side perspective view of the movable body of FIG. 1.
Figure 2B:
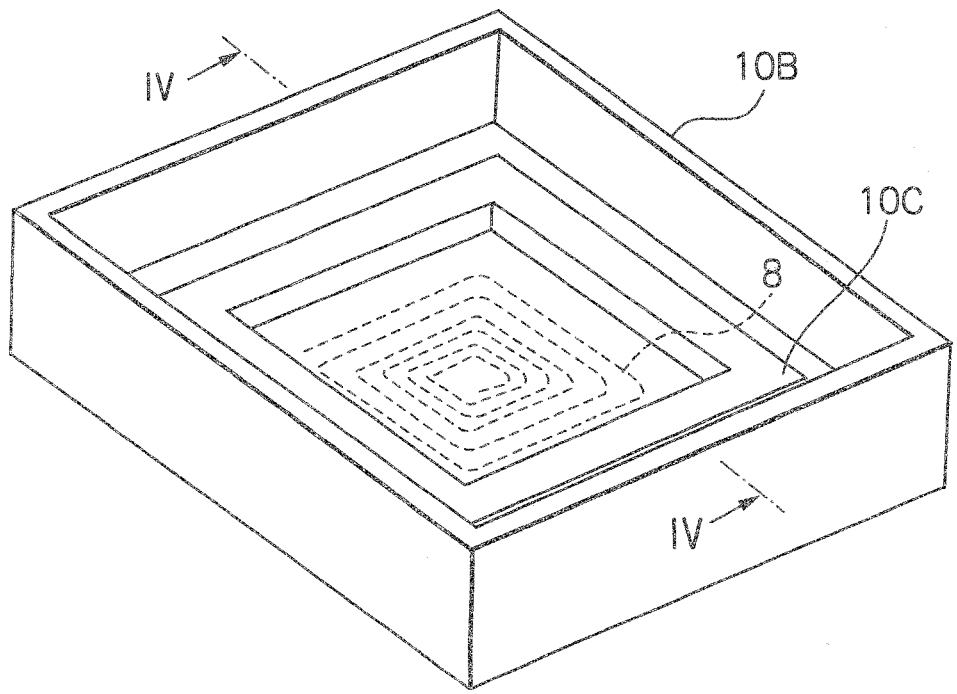
FIG. 2B is a perspective view of the package of FIG. 1.

FIG. 2A is a front-side perspective view of the movable body 10A of FIG. 1, and FIG. 2B is a perspective view of the package 10B and the spacer 10C of FIG. 1.

Referring to FIGS. 1 and 2A, the movable body 10A is constructed by a circular mirror 1 for reflecting incident light L from the laser light source 30, a pair of torsion bars 2a and 2b coupled to the mirror 1 along an X-axis on the plane of the mirror 1 centered at a center 0 of the mirror 1, an inner frame (movable frame) 3 surrounding the mirror 1 and the torsion bars 2a and 2b for supporting the mirror 1, a semi-ring shaped piezoelectric actuator 4a coupled between the torsion bars 2a and 2b and supported by an inner coupling portion 3a of the inner frame 3, and a semi-ring shaped piezoelectric actuator 4b coupled between the torsion bars 2a and 2b and supported by an inner coupling portion. 3b of the inner frame 3. In this case, the inner frame 3 has a circular inner circumference along the piezoelectric actuators 4a and 4b, and a rectangular outer circumference. The flexing direction of the piezoelectric actuator 4a is opposite to that of the piezoelectric actuator 4b, so that the piezoelectric actuators 4a and 4b serve as cantilevers for rocking the mirror 1 around the X-axis.

Thus, the rocking operation of the mirror 1 around the X-axis for the horizontal scanning is carried out by a piezoelectric driving method using the piezoelectric actuators 4a and 4b.

Also, the movable body 10A includes an outer frame (fixed frame) 5 surrounding the inner frame 3, and a pair of torsion bars 6a and 6b coupled between the inner frame 3 and the outer frame 5 along a Y-axis perpendicular to the X-axis on the plane of the mirror 1 centered at the center 0 of the mirror 1.

Permanent magnet layers 7a and 7b and a ring-shaped reinforcement rib 7c on the rear side of the movable body 10A will be explained later with reference to FIG. 3.

In more detail, the mirror 1 includes a metal layer made of Au, Pt or Al with a reflective surface. The mirror 1 can be square, rectangular, polygonal or elliptical. In this case, the inner-circumference of the inner frame 3 is adapted to the shape of the mirror 1.

The torsion bars 2a and 2b have ends coupled to the outer circumference of the mirror 1 and other ends coupled to the inner circumference of the inner frame 3. Therefore, the torsion bars 2a and 2b are twisted by the piezoelectric actuators 4a and 4b to rock the mirror 1 around the X-axis. The cross sections of the torsion bars 2a and 2b are of a square shape to have a size of about 80 to 100 µm in order to increase the maximum breakdown stress of twisting vibration in comparison with a rectangular cross section. Thus, the flexing angle of the mirror 1 along the X-axis can be increased. Note that the torsion bars 2a and 2b can be extended to be coupled to the inner frame 3 to stabilize the rocking operation of the mirror 1 along the X-axis.

The outer frame 5 is rectangular-framed to surround the inner frame 3 via the torsion bars 6a and 6b.

Referring to FIG. 2B, the package 10B is a multilayer ceramic package made of high temperature co-fired ceramic (HTCC) in which a coil 8 opposing the permanent magnet layer 7a and 7b is buried. The HTCC has good electrical properties, high mechanical strength and good thermal conductivity. Since the coil 8 is buried in the package 10B, the length of the coil 8 can be increased to increase the magnetic flux generated from the coil 8, and also, the optical deflector can further be decreased in size. Note that the coil 8 can be formed on the package 10B.

The movable body 10A is fixed via the spacer 10C on the package 10B, so that the inner frame 3 along with the mirror 1 can be rocked along the Y-axis and simultaneously, the mirror 1 can be rocked along the X-axis. For example, first, the movable body 10A is bonded to the spacer 10C by adhesives, and then, the spacer 10C is bonded to the package 10B by adhesives.

Otherwise, first, the spacer 10C is bonded to the package 10B by adhesives, and then, the movable body 10A is bonded to the spacer 10C. Note that the spacer 10C can be constructed by the package 10B; in this case, the spacer 10C is unnecessary.

Figure 3:
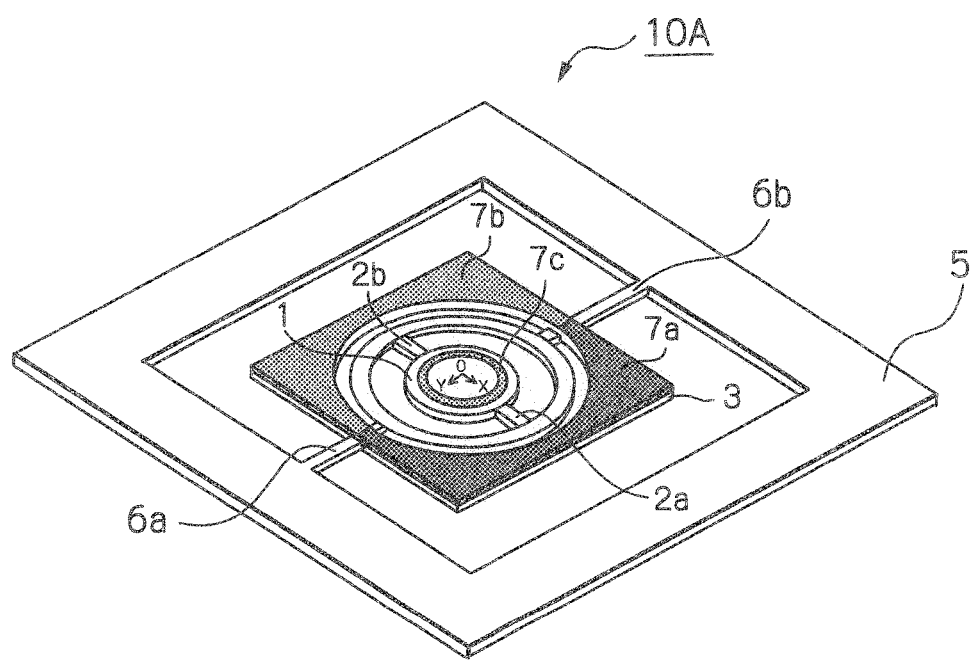
FIG. 3 is a rear-side perspective view of the movable body of FIG. 1.

FIG. 3 is a rear-side perspective view of the movable body 10A of FIG. 1.

Referring to FIG. 3, a permanent magnet layer 7a is formed on a half portion of the rear-side surface of the inner frame 3 on the positive side of the X-axis, while a permanent magnet layer 7b is formed on a half portion of the rear-side surface of the inner frame 3 on the negative side of the X-axis. That is, a boundary between the permanent magnet layers 7a and 7b coincides with the Y-axis. The magnetic poles of the permanent magnet layer 7a along the Z-axis are opposite to those of the permanent magnet layer 7b along the Z-axis.

Also, a ring-shaped reinforcement rib 7c is formed on the rear-side surface of the mirror 1. The mirror 1 is so thin that the resonant frequency of the mirror 1 can be increased. In this case, since the rigidity of the mirror 1 is very small, the ring-shaped reinforcement rib 7c can substantially compensate for the rigidity of the mirror 1. Note that the shape of the reinforcement rib 7c can be changed as occasion demands. For example, the reinforcement rib 7c can be "figure 8" shaped.

The permanent magnet layers 7a and 7b are made of a Nd—Fe—B magnetic material such as $Nd_9Fe_{14}B$ which is magnetized to generate a magnetic flux which is much larger than those of conventional bulk permanent magnets made of magnetic materials such as CoPt. Therefore, the permanent magnet layers 7a and 7b can be very thin, i.e., about 6 to 10 µm thick, which would decrease the optical deflector in size.

Thus, the rocking operation of the mirror 1 around the Y-axis for the vertical scanning is carried out by an electromagnetic driving method using the permanent magnet layers 7a and 7b and the coil 8. Since the electromagnetic driving method is not dependent upon the frequency characteristics, the vertical scanning can be carried out at a non-resonant frequency such as 60 Hz.

Also, the ring-shaped reinforcement is made of the Nd—Fe—B magnetic material such as $Nd_2Fe_{14}B$, in this case; however, $Nd_2Fe_{14}B$ of the ring-shaped reinforcement rib 7c is not subject to magnetization. Additionally, the specific gravity of $Nd_2Fe_{14}B$ is 7.6, while the specific gravity of Si is 2.3. On the other hand, the rigidity (Young's modulus) of $Nd_2Fe_{14}B$, that is about 160 GP, is substantially the same as that of Si. Therefore, the ring-shaped reinforcement rib 7c is thin, i.e., about 6 to 10 µm. It can correspond to 20 to 30 µm thickness of silicon. Thus, the ring-shaped reinforcement rib 7c substantially can sufficiently serve as a reinforcement.

FIG. 4 is a cross-sectional view taken along the line IV-IV in FIGS. 2A and 2B where the movable body 10A is bonded via the spacer 10C onto the package 10B.

In FIG. 4, the pads $P_{Xa}$, $P_{Ga}$ $P_{Xb}$ and $P_{Gb}$ on the outer frame 5 are connected via bonding wires 9a and 9b to pads $P_{Xa}'$, $P_{Ga}'$, $P_{Xb}'$ and $P_{Gb}'$ on the package 10B and are further connected via interconnects 9a' and 9b' of the package 10B to terminals $T_{Xa}$, $T_{Ga}$, $T_{Xb}$ and $T_{Gb}$ on the rear surface of the package 10B. The terminals $T_{Xa}$ and $T_{Xb}$ are connected to the control unit 20, while the terminals $T_{Ga}$ and $T_{Gb}$ are grounded.

Also, in FIG. 4, the coil 8 is connected via interconnects 9a" and 9b" of the package 10B to terminals $T_{Ya}$ and $T_{Yb}$ on the rear surface of the package 10B. The terminals $T_{Ya}$ and $T_{Yb}$ are connected to the control unit 20.

Further, in FIG. 4, for example, the permanent magnet layer 7a is magnetized so that the lower surface of the permanent magnet layer 7a serves as an N-pole to generate a downward magnetic flux Ba. On the other hand, the permanent magnet layer 7b is magnetized. so that the lower surface of the permanent magnet layer 7b serves as an S-pole to generate a downward magnetic flux Bb. In this state, when an alternating current "i" whose value is less than 1 A, is supplied to the coil 8, a magnetic flux Bc is changed in accordance with the alternating current "i". For example, when the magnetic flux Bc is upward, the upper portion of the coil 8 serves as an N-pole. Therefore, a repulsive force occurs between the N-pole of the permanent magnet layer 7a and the N-pole of the coil 8, while an attractive force occurs between the S-pole of the permanent magnet layer 7b and the N-pole of the coil 8. Contrary to this, when the magnetic flux Bc is downward, the upper portion of the coil 8 serves as an S-pole. Therefore, an attractive force occurs between the N-pole of the permanent magnet layer 7a and the S-pole of the coil 8, while a repulsive force occurs between the S-pole of the permanent magnet layer 7b and the S-pole of the coil 8. As a result, the inner frame 3 is rocked around the torsion bars 6a and 6b due to the repulsive force and the pulling force, so that the mirror 1 is rocked around the Y-axis by the alternating current "i".

Note that although the ring-shaped reinforcement rib 7c is made of $Nd_2Fe_{14}B$, the ring-shaped reinforcement rib 7c is not magnetized, so that the ring-shaped reinforcement rib 7c does not interact with the magnetic flux Bc generated from the coil 8.

The control unit 20 applies a drive voltage $V_{Xa}$ via the terminal $T_{Xa}$, the interconnect 9a', the pad $P_{Xa}'$ and the bonding wire 9a to the pad $P_{Xa}$ and applies a drive voltage $V_{Xb}$ via the terminal $T_{Xb}$, the interconnect 9b', the pad $P_{Xb}$' and the bonding wire 9b to the pad $P_{Xb}$. As illustrated in FIGS. 5A and 5B, the drive voltages $V_{Xa}$ and $V_{Xb}$ are sinusoidal, and the drive voltage $V_{X1}$ is opposite in phase to the drive voltage $V_{Xb}$. For example, the frequency $f_X$ of the drive voltages $V_{Xa}$ and $V_{Xb}$ is one resonant frequency $f_r$ such as 25 kHz depending upon a resonant structure formed by the mirror 1, the torsion bars 2a and 2b and the piezoelectric actuators 4a and 4b.

The pad $P_{Xa}$ is connected via the wiring layer 108 (see: FIG. 11L) to the upper electrode layers 106 (see: FIG. 11L) of the piezoelectric actuator 4a.

The pad $P_{Ga}$, which is grounded, is connected via viastructure (not shown) to the lower electrode layer 104 (see: FIG. 11L) of the piezoelectric actuator 4a.

The pad $P_{Xb}$ is connected via the wiring layer 108 (see: FIG. 11L) to the upper electrode layers 106 (see: FIG. 11L) of the piezoelectric actuator 4b.

The pad $P_{Gb}$, which is grounded, is connected via a via-structure (not shown) to the lower electrode layer 104 (see: FIG. 11L) of the piezoelectric actuator 4b.

The control unit 20 applies a drive voltage $V_{Ya}$ from terminal $T_{Ya}$ via an interconnect 9a'' to an end of the coil 8, and also, applies a drive voltage $V_{Yb}$ from terminal $T_{Yb}$ via an interconnect 9b'' to another end of the coil 8. As illustrated in FIGS. 5C and 5D, the drive voltages $V_{Ya}$ and $V_{Yb}$ are sinusoidal or saw-tooth-shaped, and the drive voltage $V_{Ya}$ is opposite in phase to the drive voltage $V_{Yb}$. For example, the frequency $f_Y$ of the drive voltages $V_{Ya}$ and $V_{Yb}$ is 60 Hz, much lower than the resonant frequency $f_r$.

Figure 6A:
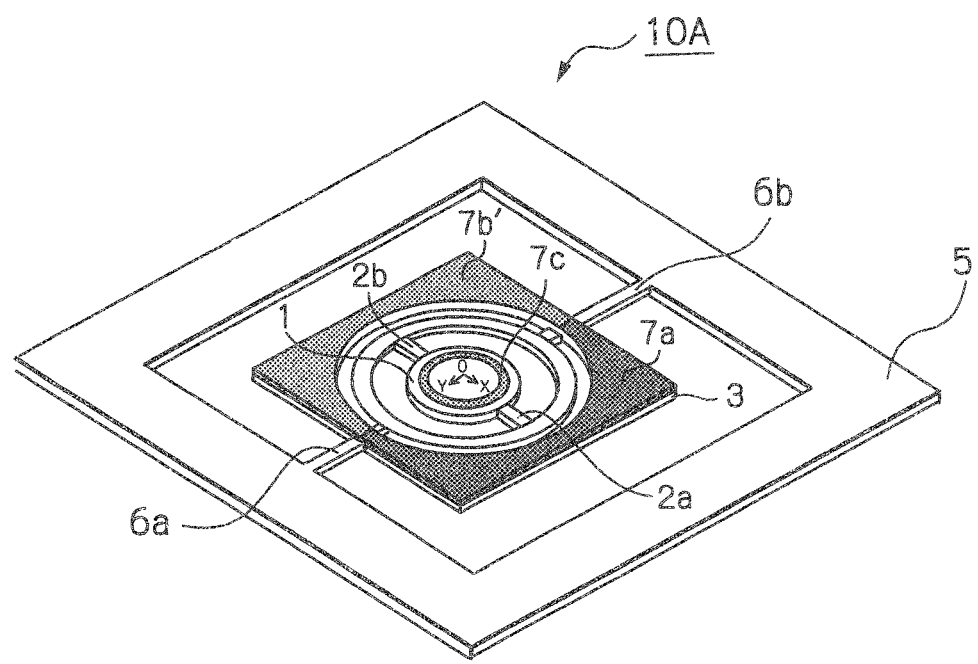
FIGS. 6A, 6B and 6C are rear-side perspective views illustrating modifications of the movable body of FIG. 1.
Figure 6B:
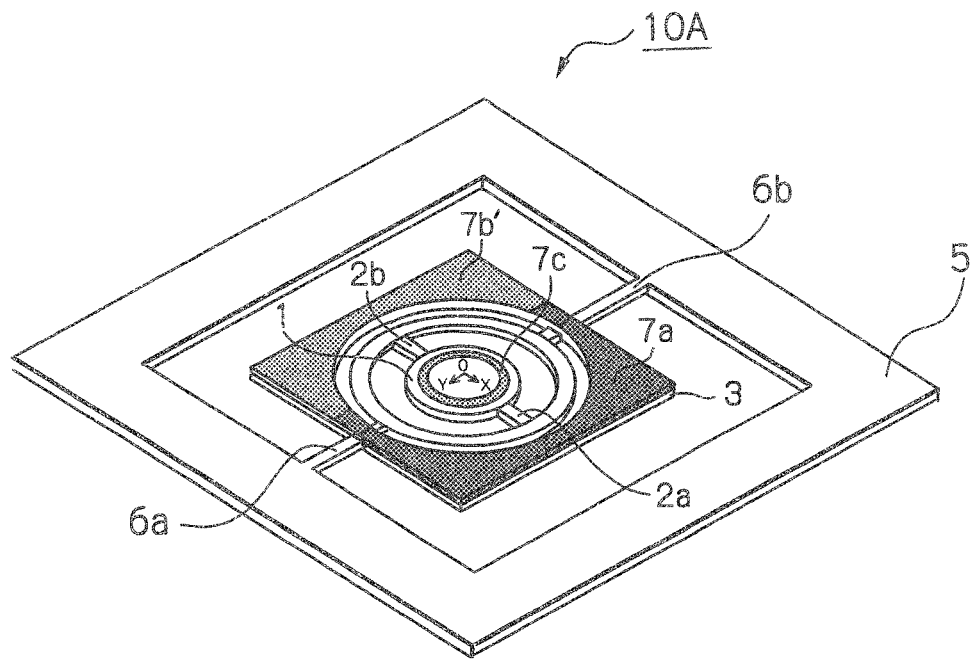
Figure 6C:
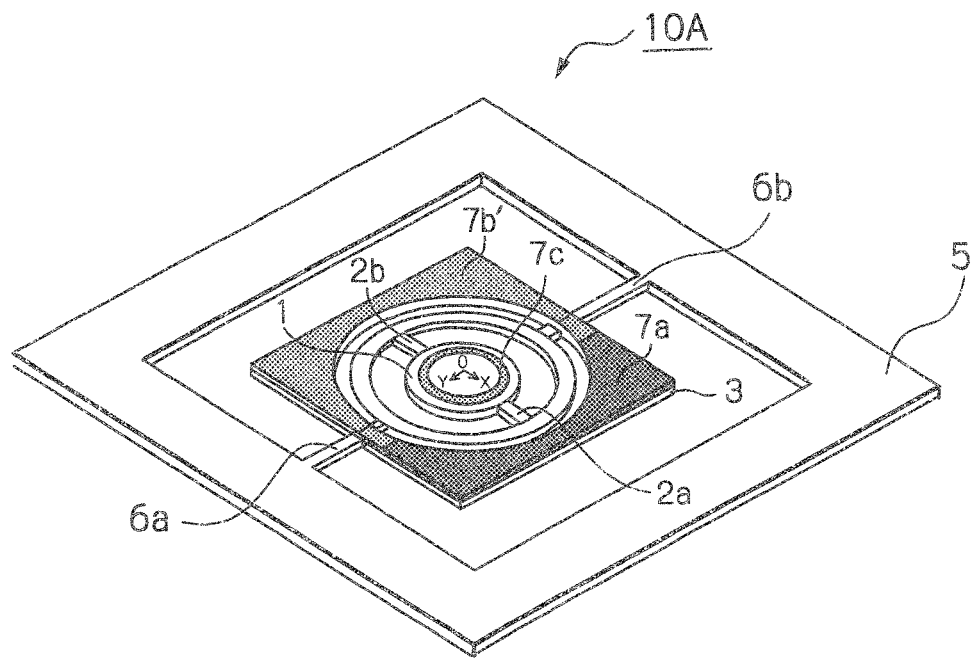

FIGS. 6A, 6B and 6C are rear-side perspective views illustrating modifications of the movable body 10A of FIG. 1.

In FIG. 6A, the permanent magnet layer 7b of FIG. 3 is replaced by a non-magnetized layer 7b' which is also made of $Nd_2Fe_{14}B$. That is, the non-magnetized layer 7b' is not subject to magnetization. Even in this case, the boundary between the permanent magnet layer 7a and the non-magnetized layer 7b' is at the Y-axis. Therefore, a repulsive force or an attractive force occurs only between the N-pole of the permanent magnet layer 7a and the N-pole or S-pole of the coil 8. As a result, although the torque of the inner frame 3 becomes smaller to decrease the flexing amount of the inner frame 3, the inner frame 3 can be rocked around the torsion bars 6a and 6b, so that the mirror 1 can be rocked around the Y-axis. Since only the permanent magnet layer 7a is subject to magnetization, the magnetizing process can be simplified so that the manufacturing cost can be decreased.

In FIG. 6B, as the area of the permanent magnet layer 7a of FIG. 6A is increased, the boundary between the permanent magnet layer 7a and the non-magnetized layer 7b' is moved toward the negative-side of the Y-axis. Even in this case, a repulsive force or an attractive force occurs only between the N-pole of the permanent magnet layer 7a and the N-pole or S-pole of the coil 8. Since the boundary of the permanent magnet layer 7a and the non-magnetized layer 7b' is not severe, the magnetizing process can further be simplified, so that the manufacturing cost can be further decreased.

In FIG. 6C, as the area of the permanent magnet layer 7a of FIG. 6A is decreased, the boundary between the permanent magnet layer 7a and the non-magnetized layer 7b' is moved toward the positive-side of the Y-axis. Even in this case, a repulsive force or an attractive force occurs only between the N-pole of the permanent magnet layer 7a and the N-pole or S-pole of the coil 8. Since the boundary of the permanent magnet layer 7a and the non-magnetized layer 7b' is not severe, the magnetizing process can further be simplified, so that the manufacturing cost can be further decreased.

Thus, the boundary between the permanent magnet layer 7a and the non-magnetized layer 7b' is preferably at the Y-axis; however, this boundary can be shifted from the Y-axis, i.e., this boundary can be close to the Y-axis and along the Y-axis, which would decrease the manufacturing cost.

Figure 7:
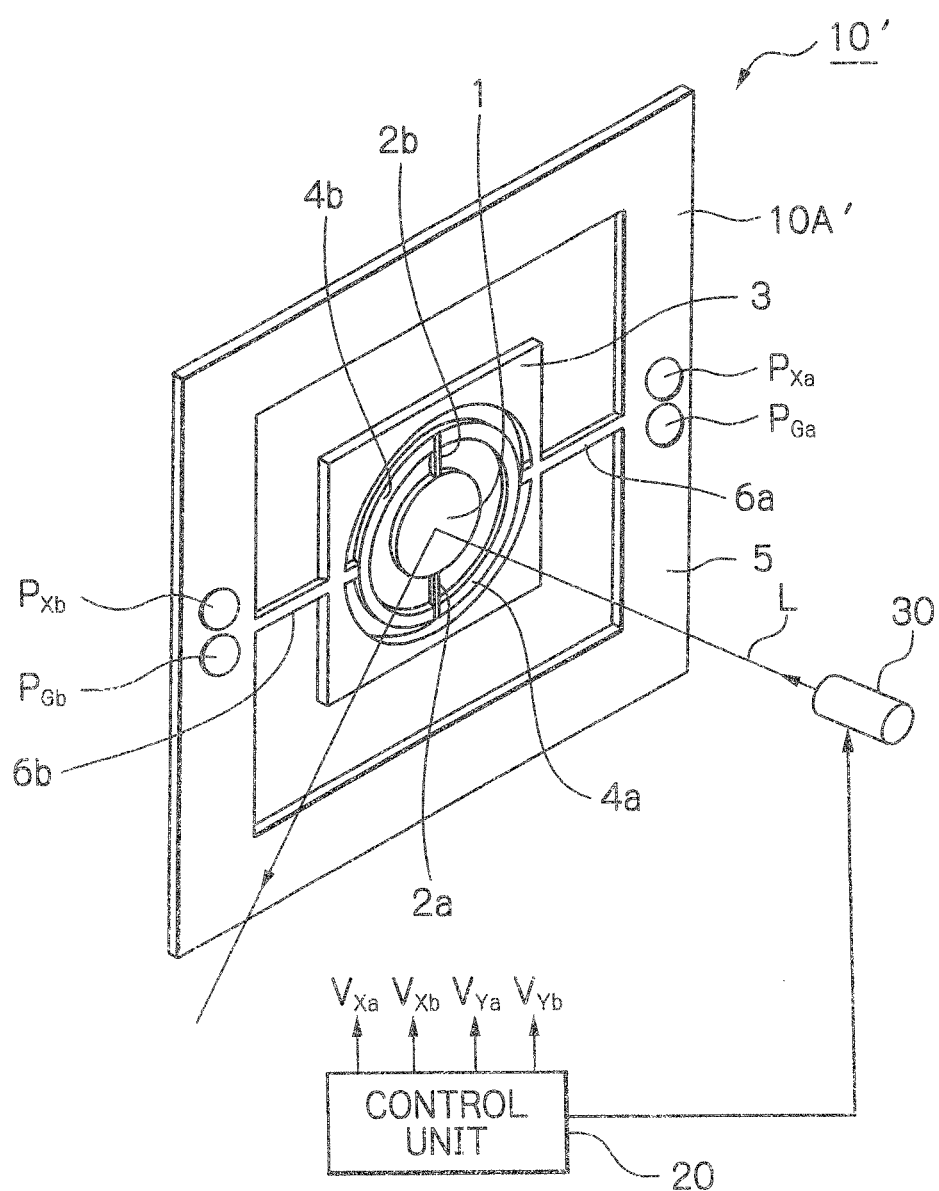
FIG. 7 is a front-side perspective view illustrating an optical scanner including a second embodiment of the two-dimensional optical deflector according to the presently disclosed subject matter.

In FIG. 7, which illustrates an optical scanner including a second embodiment of the two-dimensional optical deflector according to the presently disclosed subject matter, the two-dimensional optical deflector 10 of FIG. 1 is replaced by a two-dimensional optical deflector 10'. The two-dimensional optical deflector 10' is constructed by a movable body 10A', a package 10B' serving as a base for supporting the movable body 10A', and a spacer 10C' interposed between the movable body 10A' and the package 10B'. Even in this case, note that the package 10B' and the spacer 10C' are shown not in FIG. 7, but in FIG. 8B. Note that the spacer 10C' can be constructed by the package 10B'; in this case, the spacer 10C' is unnecessary.

Figure 8A:
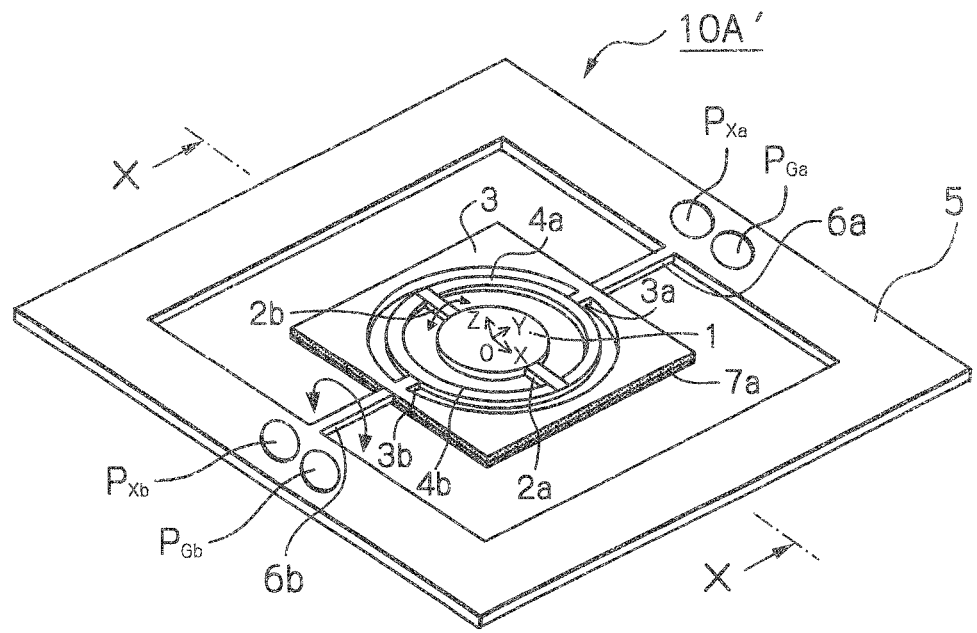
FIG. 8A is a front-side perspective view of the movable body of FIG. 7.
Figure 8B:
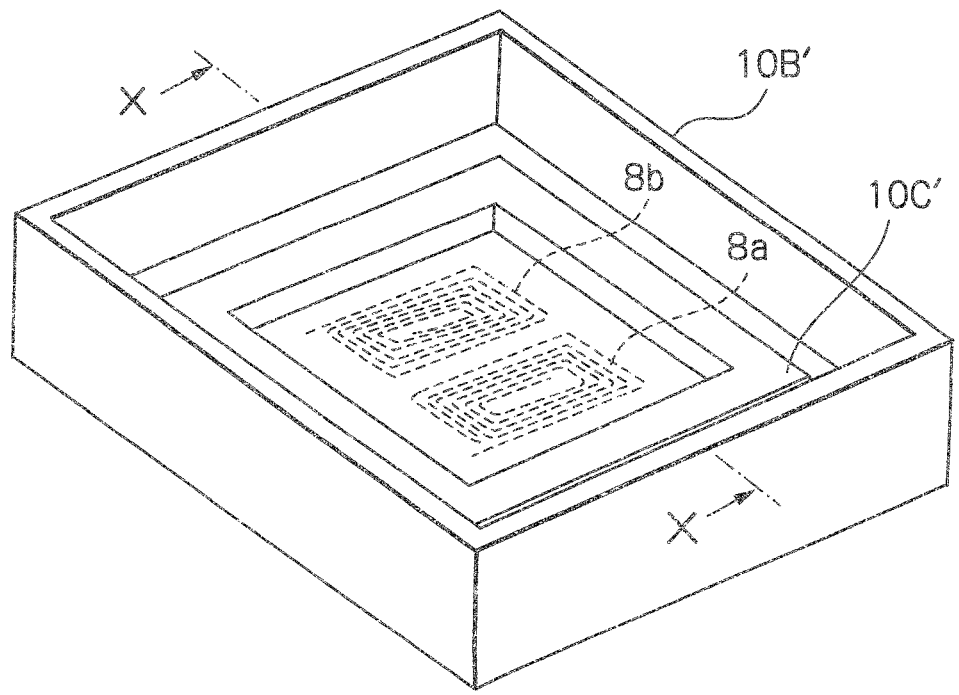
FIG. 8B is a perspective view of the package of FIG. 7.
Figure 9:
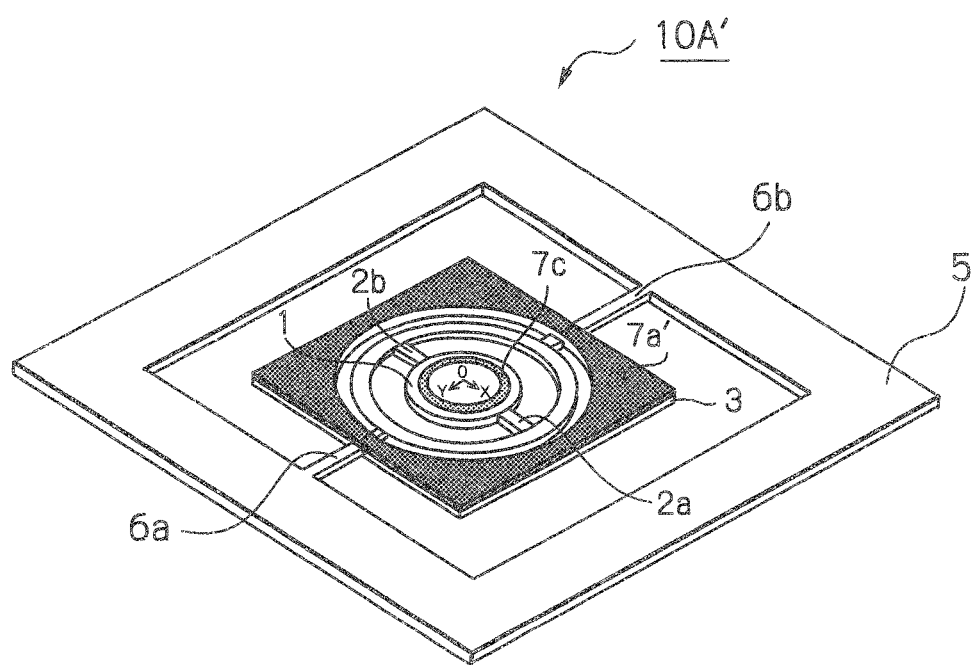
FIG. 9 is a rear-side perspective view of the movable body of FIG. 7.

FIG. 8A is a front-side perspective view of the movable body 10A' of FIG. 7, FIG. 8B is a perspective view of the package 10B' and the spacer 10C' of FIG. 7, and FIG. 9 is a rear-side perspective view of the movable body 10A' of FIG. 7.

In FIG. 8B, the coil 8 of FIG. 2B is replaced by two coils 8a and 8b whose winding directions are opposite to each other.

In FIG. 9, a permanent magnet layers 7a' is formed on the entire rear-side surface of the inner frame 3.

Figure 10:
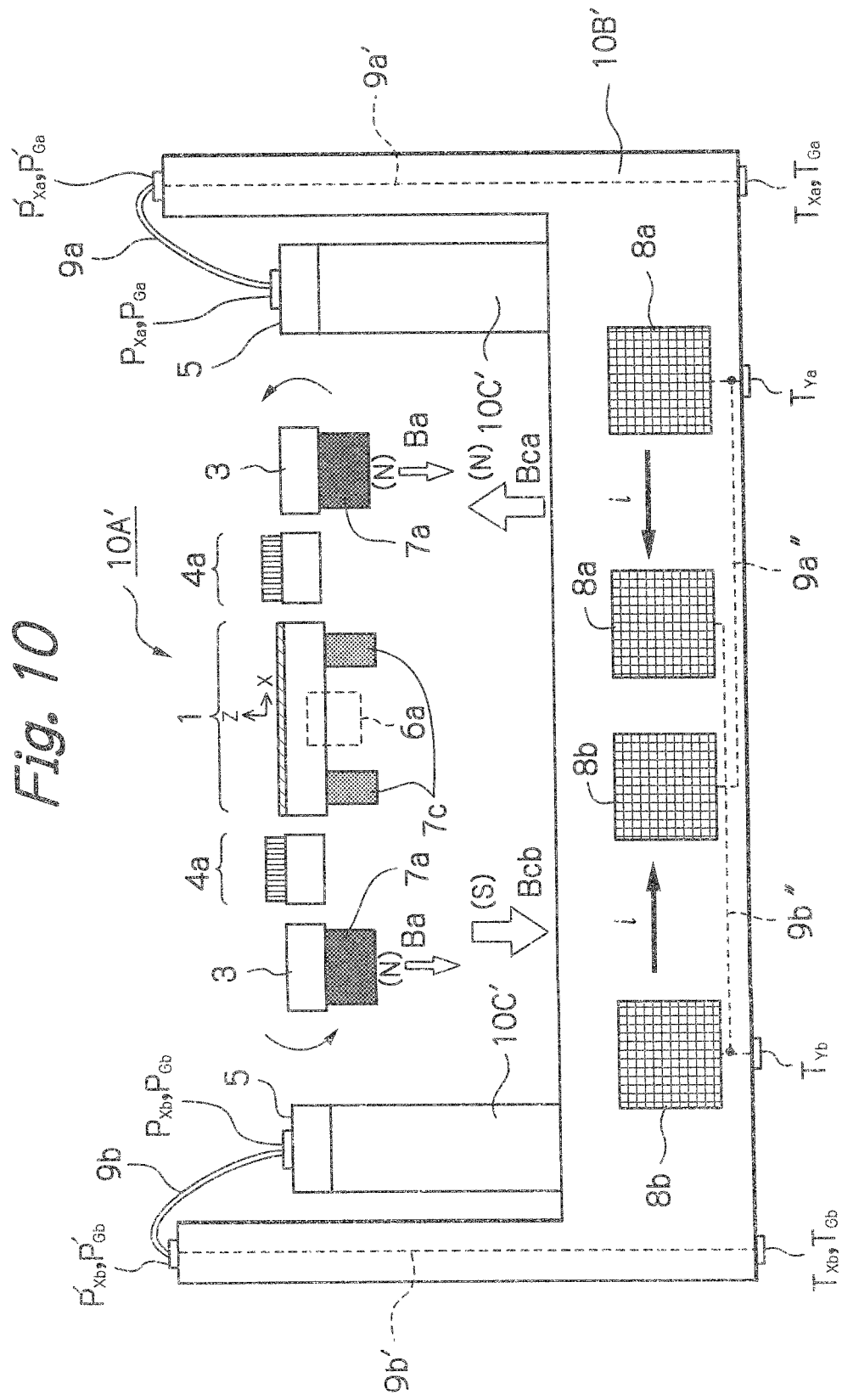
FIG. 10 is a cross-sectional view taken along the line X-X in FIGS. 8A and 8B where the movable body of FIG. 8A is bonded onto the package of FIG. 8B.

FIG. 10 is a cross-sectional view taken along the line X-X in FIGS. 8A and 8B where the movable body 10A' is bonded via the spacer 10C' onto the package 10B'.

In FIG. 10, the coils 8a and 8b opposing the permanent magnet layer 7a' are connected in parallel by interconnects 9a'' and 9b'' of the package 10B' to the terminals $T_{Ya}$ and $T_{Yb}$ on the rear surface of the package 10B'. Therefore, when the alternating current "i" is supplied to the coils 8a and 8b, the Z-axis direction of a magnetic flux Bca generated from the coil 8a is opposite to that of a magnetic flux Bcb generated from the coil 8b.

Further, in FIG. 10, for example, the permanent magnet layer 7a is magnetized so that the lower surface of the permanent magnet layer 7a serves as an N-pole to generate a downward magnetic flux Ba. In this state, when an alternating current "i" whose value is less than 1 A, is supplied to the coils 8a and 8b, the magnetic fluxes Bca and Bcb opposite in direction to each other are changed in accordance with the alternating current "i". For example, when the magnetic fluxes Bca and Bcb are upward and downward, respectively, the upper portion of the coils 8a and 8b serve as an N-pole and an S-pole, respectively. Therefore, a repulsive force occurs between the N-pole of the permanent magnet layer 7a and the N-pole of the coil 8a, while an attractive force occurs between the N-pole of the permanent magnet layer 7a and the S-pole of the coil 8b. Contrary to this, when the magnetic fluxes Bca and Bcb are downward and upward, respectively, the upper portion of the coils 8a and 8b serve as an S-pole and an N-pole, respectively. Therefore, an attractive force occurs between the N-pole of the permanent magnet layer 7a and the S-pole of the coil 8a, while a repulsive force occurs between the N-pole of the permanent magnet layer 7a and the N-pole of the coil 8b. As a result, the inner frame 3 is rocked around the torsion bars 6a and 6b due to the repulsive force and the pulling force, so that the mirror 1 is rocked around the Y-axis.

In FIGS. 8B and 10, if the winding direction of the coil 8a is the same as that of the coil 8b, the coils 8a and 8b can be anti-parallelly connected by interconnects of the package 10B' to the terminals $T_{Ya}$ and $T_{Yb}$.

A method for manufacturing the two-dimensional optical deflector of FIG. 1 will be explained in more detail with reference to FIGS. 11A through 11L.

First, referring to FIG. 11A, a bare monocrystalline silicon wafer (substrate) 101 made of an about 300 µm thick monocrystalline silicon is prepared. Then, the bare monocrystalline silicon wafer 101 is oxidized by a thermal oxidation process, so that about 1 µm thick silicon dioxide layers 102 and 103 are formed on both surfaces of the bare monocrystalline silicon wafer 101.

Next, referring to FIG. 11B, a Pt/Ti lower electrode layer 104 consisting of an about 50 nm thick Ti and an about 150 nm thick Pt on Ti is formed by a sputtering process. Then, an about 3 µm thick titanate zirconate (PZT) layer 105 is deposited on the lower electrode layer 105 by an arc discharge reactive ion plating (ADRIP) process at a temperature of about 500° C. to 600° C. Then, an about 150 nm thick Ti upper electrode layer 106 is formed on the PZT layer 105 by a sputtering process.

Next, referring to FIG. 11C, the upper electrode layer 106 and the PZT layer 105 are patterned by a photolithography and etching process. Then, the lower electrode layer 104 and the silicon dioxide layer 103 are patterned by a photolithography and etching process.

Next, referring to FIG. 11D, an about 500 nm thick silicon dioxide interlayer 107 is formed on the entire surface by a plasma chemical vapor deposition (CVD) process.

Figure 11E:
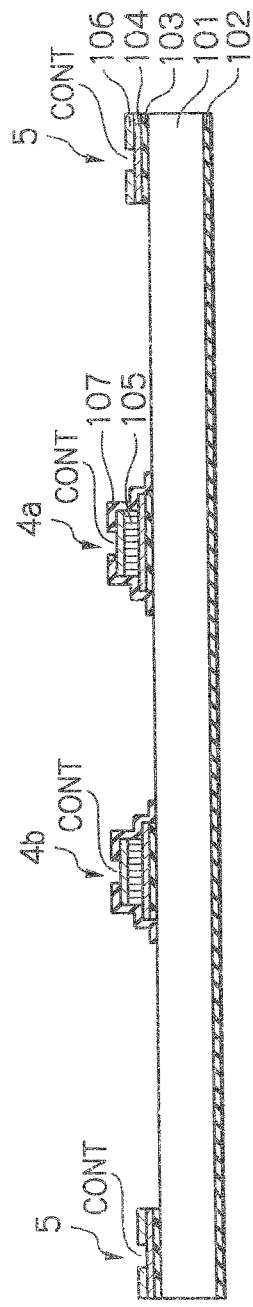

Next, referring to FIG. 11E, contact holes CONT are perforated in the silicon dioxide interlayer 107 by a photolithography and dry etching process. The contact holes CONT correspond to the piezoelectric actuators 4a and 4b, the pads $P_{Xa}$, $P_{Ga}$, $P_{Xb}$ and $P_{Gb}$.

Figure 11F:
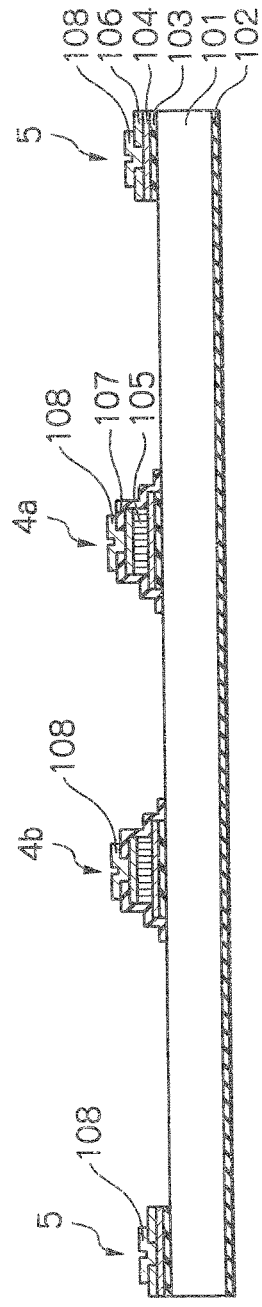

Next, referring to FIG. 11F, wiring layers 108 made of AlCu (1% Cu) are formed by a photolithography process, a sputtering process, and a lift-off process. The wiring layers 108 are electrically connected between the upper electrode layers 106 of the piezoelectric actuators 4a and 4b, and their corresponding pads $P_{Xa}$, $P_{Ga}$, $P_{Xb}$ and $P_{Gb}$.

Figure 11G:
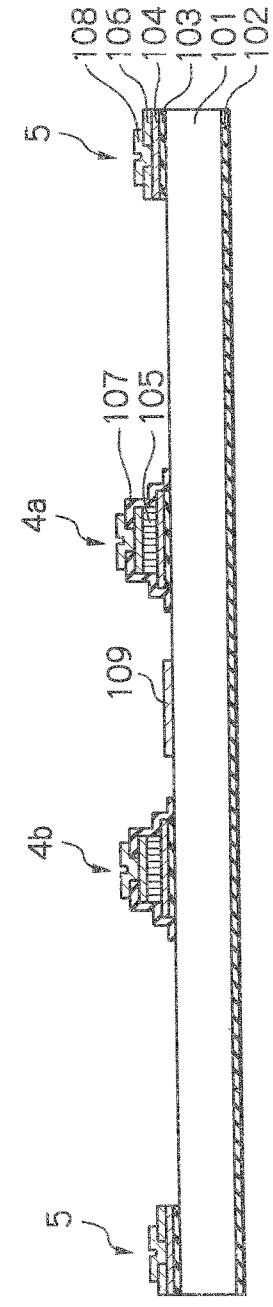

Next, referring to FIG. 11G, an aluminum (Al) reflective metal layer 109 is formed by an evaporation process, and is patterned by a photolithography and etching process.

Figure 11H:
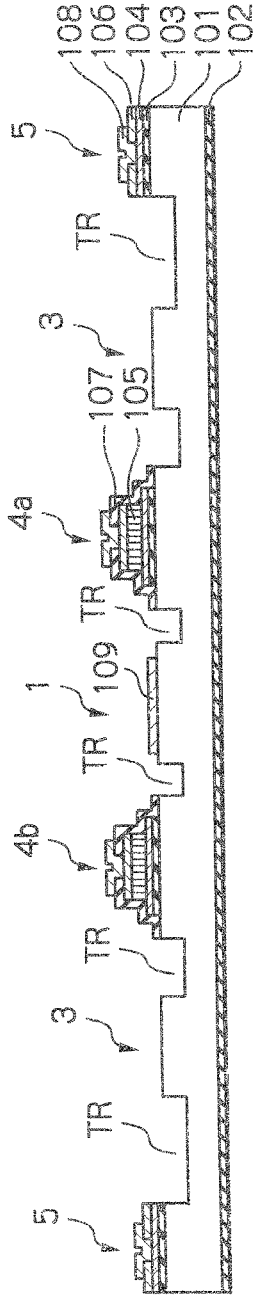

Next, referring to FIG. 11H, trenches TR are formed in the silicon substrate 101 by a deep-reactive ion etching (DRIE) process. The trenches TR are used for separating the mirror 1, the torsion bars 2a and 2b, the inner frame 3, the piezoelectric actuators 4a and 4b, the outer frame 5, and the torsion bars 6a, and 6b from each other.

Next, referring to FIG. 11I, a wax layer 110 is coated on the entire front surface, and a support wafer 111 is temporarily bonded to the wax layer 110.

Next, referring to FIG. 11J, a chemical mechanical polishing (CMP) process is performed upon the entire rear-side surface, so that the silicon substrate 101 becomes about 40 µm thick. Therefore, the trenches TR are changed to through-holes TH. As a result, the mirror 1, the torsion bars 2a and 2b, the inner frame 3, the piezoelectric actuators 4a and 4b, the outer frame 5, and the torsion bars 6a and 6b are separated from each other.

Next, referring to FIG. 11K, a magnetic layer made of $Nd_2Fe_{14}B$ is formed on rear-side surface of the silicon substrate 101 at the mirror 1 and the inner frame 3 by a sputter process using a shadow mask.

Figure 12A:
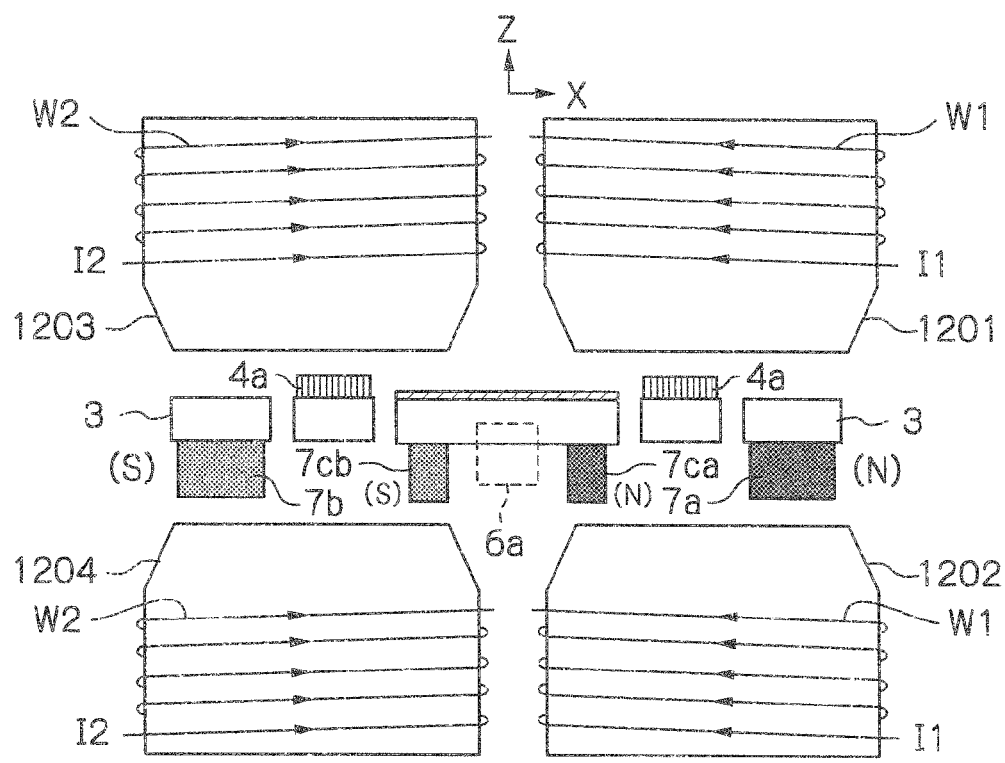
FIGS. 12A and 12B, FIGS. 13A and 13B, and FIGS. 14A and 14B are cross-sectional views for explaining the magnetizing and demagnetizing processes of FIG. 11L.
Figure 12B:
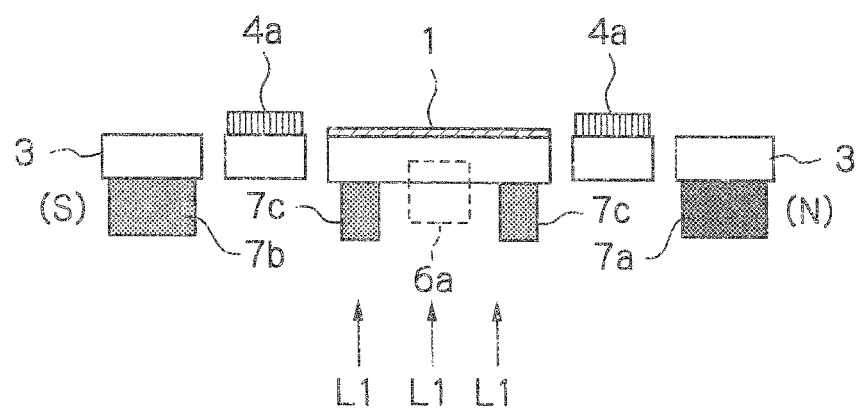

In this state, a magnetizing process is performed upon the magnetic layer, as illustrated in FIG. 12A where a pair of yokes 1201 and 1202 on which a winding W1 for receiving a DC current I1 is placed and a pair of yokes 1203 and 1204 on which a winding W2 for receiving a DC current I2 is placed are provided. In this case, the direction of the winding W1 is opposite to that of the winding W2. Therefore, the magnetic layer on the positive-side of the X-axis at the inner frame 4a is magnetized to form a permanent magnet layer 7a with an N-pole on the lower surface thereof, while the magnetic layer on the negative-side of the X-axis at the inner frame 3 is magnetized to form a permanent magnet layer 7b with an S-pole on the lower surface thereof. On the other hand, the magnetic layer at the mirror 1 may be magnetized, i.e., the magnetic layer at the mirror 1 may be permanent magnet layers 7ca and 7cb similar to the permanent magnet layers 7a and 7b. In this case, a demagnetizing process is performed upon the magnetic layer at the mirror 1 as illustrated in FIG. 12B where this magnetic layer is irradiated with laser light L1 to be heated up over its Curie temperature. Thus, magnetic dipoles in the magnetic layer on the mirror 1 are dispersed. Therefore, the magnetic layer at the mirror 1 becomes a non-magnetized layer. As a result, this non-magnetized layer can serves as a ring-shaped reinforcement rib 7c.

Figure 13A:
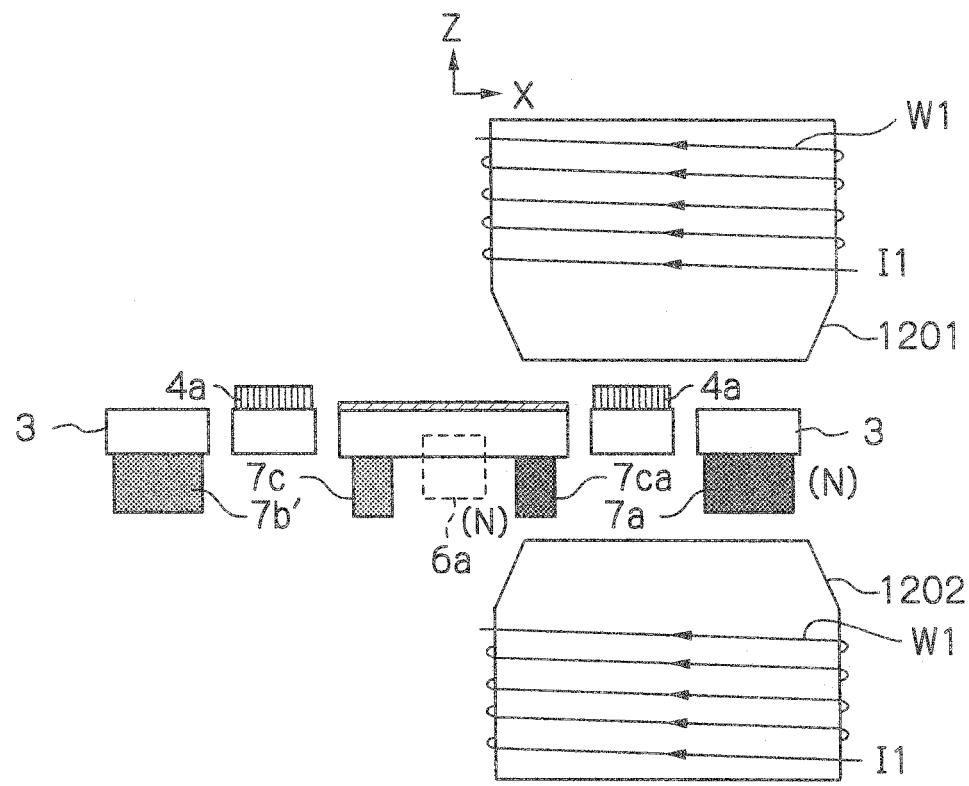
Figure 13B:
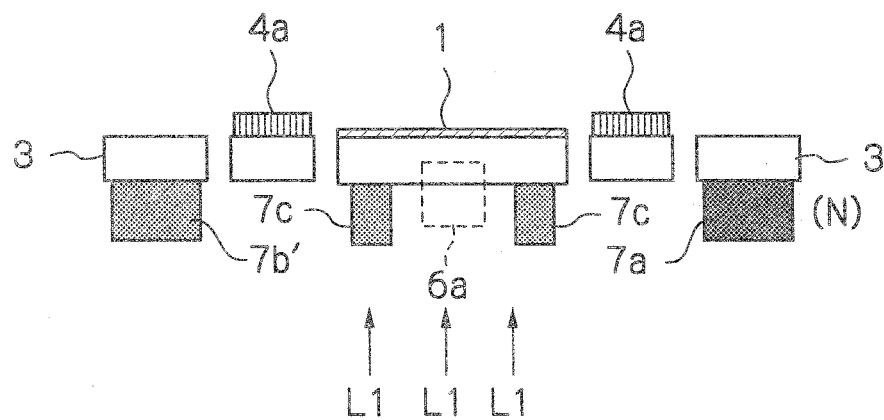

Also, when. forming the permanent magnet layer 7a and the non-magnetized layer 7b' in FIG. 6A, 6B or 6C, a magnetizing process using only the yokes 1201 and 1202 and the winding W1 for receiving the current I1 is carried out as illustrated in FIG. 13A, and a demagnetizing process is carried out as illustrated in FIG. 13B which is the same as FIG. 12B.

Figure 14A:
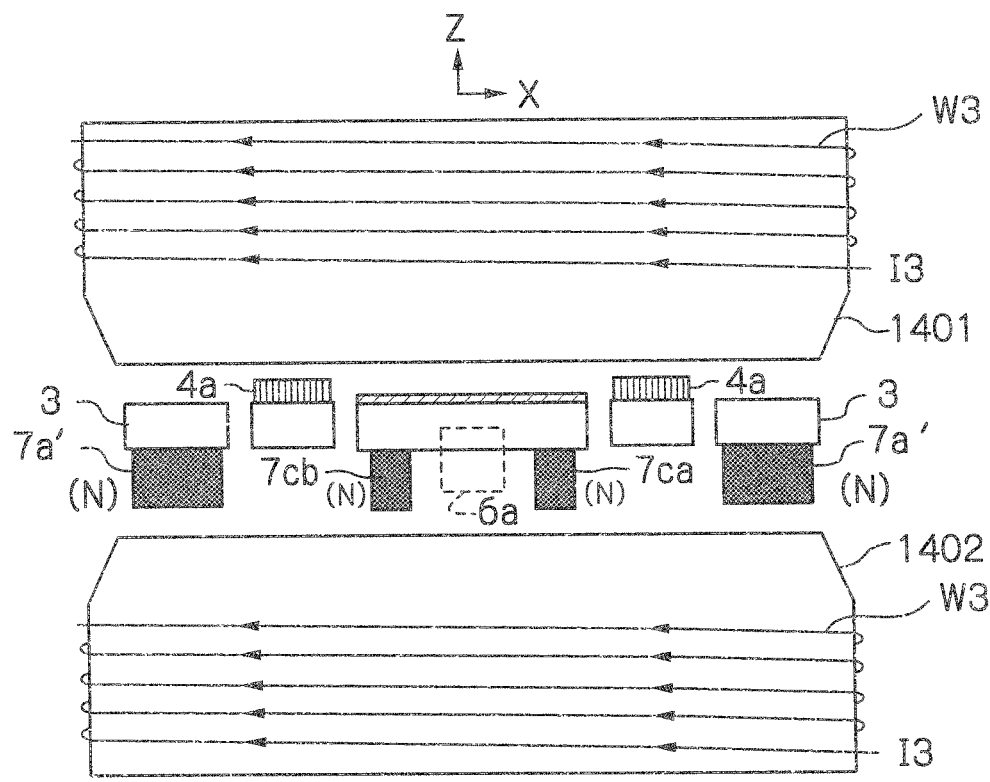
Figure 14B:
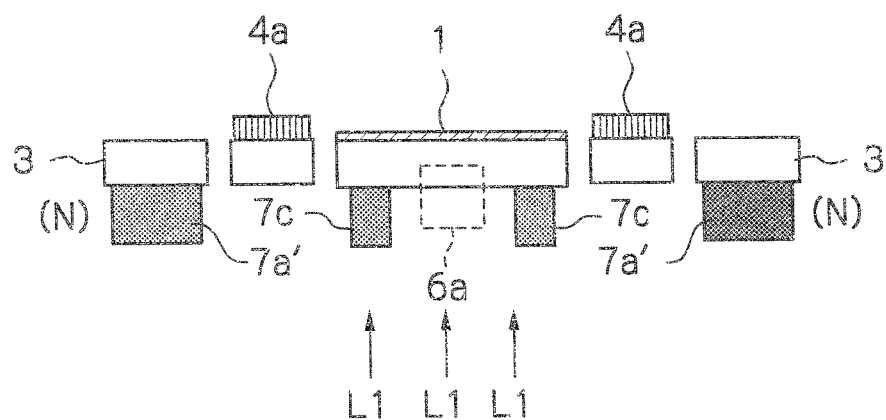

Further, when forming the permanent magnet layer 7a' in FIG. 9, a magnetizing process using yokes 1401 and 1402 and a winding W3 for receiving the current I3 is carried out as illustrated in FIG. 14A, and a demagnetizing process is carried out as illustrated in FIG. 14B which is the same as FIG. 12B.

Note that, if the yokes 1201 to 1204 of FIG. 12A, the yokes 1201 and 1202 of FIG. 13A and the yokes 1401 and 1402 of FIG. 14A are modified so that the magnetic layer at the mirror 1 is not magnetized, the demagnetizing process as illustrated in FIG. 12B, FIG. 13B and FIG. 14B is unnecessary.

Finally, referring to FIG. 11L, the outer frame 5 is aligned to the spacer 8 of the package 10B, and then, the outer frame 5 is bonded to a spacer 8 by adhesives. Then, the support wafer 111 is removed.

Then, the silicon substrate 101 is diced by a stealth dicing method using laser or the like, and each of the diced chips is mounted on a package formed by high temperature co-fired ceramic (HTCC), thus completing the two-dimensional optical deflector of FIG. 1.

According to the manufacturing method as illustrated in FIGS. 11A through 11L, since utilization of the bare silicon wafer is much less expensive as compared with a silicon-on-insulator (SOI) substrate, the manufacturing cost can be decreased.

According to the inventor's experiment, when the two-dimensional optical deflector of FIG. 1 was operated by sinusoidal drive voltages $V_{Xa}$ and $V_{Xb}$ at a resonant frequency $f_x$=29 kHz for a horizontal scanning and saw-tooth drive voltages $V_{Ya}$ and $V_{Yb}$ at a non-resonant frequency $f_y$=60 kHz for a vertical scanning, the horizontal flexing angle of the mirror was 28° and the vertical flexing angle of the mirror was 16°. Also, the dynamic deformation of the mirror was suppressed by the ring-shaped reinforcement rib made of $Nd_2Fe_{14}B$. Thus, the two-dimensional optical deflector of FIG. 1 can sufficiently be applied to a high definition (HD) resolution projector. Further, the drive voltages $V_{Xa}$ and $V_{Xb}$ for the horizontal scanning were 10 V and the drive voltages $V_{Ya}$ and $V_{Yb}$ for the vertical scanning were 3.3 V. That is, the drive voltages $V_{Ya}$ and $V_{Yb}$ for the vertical scanning can remarkably be reduced as compared with the first prior art two-dimensional optical deflector where the drive voltages for the vertical scanning is 60 V.

It will be apparent to those skilled in the art that various modifications and variations can be made in the presently disclosed subject matter without departing from the spirit or scope of the presently disclosed subject matter. Thus, it is intended that the presently disclosed subject matter covers the modifications and variations of the presently disclosed subject matter provided they come within the scope of the appended claims and their equivalents. All related or prior art references described above and in the Background section of the present specification are hereby incorporated in their entirety by reference.

The invention claimed is:

1. A two-dimensional optical deflector comprising:
   a mirror;
   two first torsion bars coupled to said mirror along a first axis;
   an inner frame surrounding said mirror and said first torsion bars;
   two piezoelectric actuators each coupled between said first torsion bars and supported by an inner coupling portion of said inner frame, adapted to rock said mirror around said first axis;
   an outer frame surrounding said inner frame;
   two second torsion bars coupled between said inner frame and said outer frame along a second axis;
   a first permanent magnet layer formed on at least a part of a rear-side surface of said inner frame;
   a base for supporting a rear-side surface of said outer frame; and
   a coil formed at said base opposing said first permanent magnet layer;
   a magnetic flux generated from said coil interacting with a magnetic flux of said first permanent magnetic layer to rock said mirror around said second axis.

2. The two-dimensional optical deflector as set forth in claim 1, further comprising a second permanent magnet layer formed on the rear-side surface of said inner frame adjacent to said first permanent magnet layer,
   a boundary between said first and second permanent magnet layers being arranged at said second axis,
   a polarity of a magnetic pole at a rear-side surface of said first permanent magnet layer being opposite to a polarity of a magnetic pole at a rear-side surface of said second permanent magnet layer,
   said coil being adapted to generate a magnetic flux interacting with magnetic fluxes generated from said first and second permanent magnet layers.

3. The two-dimensional optical deflector as set forth in claim 1, further comprising a non-magnetized layer formed on the rear-side surface of said inner frame adjacent to said first permanent magnet layer,
   a boundary between said first permanent magnet layer and said non-magnetized layer being arranged at said second axis or close to said second axis along said second axis,
   said coil being adapted to generate a magnetic flux interacting with a magnetic flux from said first permanent magnet layer.

4. The two-dimensional optical deflector as set forth in claim 1, wherein said first permanent magnet layer is on the entire rear-side surface of said inner frame,
   said coil comprising first and second coil separated by said second axis,
   said second axis said first and second coils being adapted to generate first and second magnetic fluxes, whose directions oppose each other, interacting with a magnetic flux generated from said first permanent layer.

5. The two-dimensional optical deflector as set forth in claim 1, wherein said first permanent magnet layer comprises magnetized Nd—Fe—B magnetic material.

6. The two-dimensional optical deflector as set forth in claim 2, wherein said second permanent magnet layer comprises magnetized Nd—Fe—B magnetic material.

7. The two-dimensional optical deflector as set forth in claim 1, wherein said base comprises a ceramic package,
   said coil being buried in said ceramic package.

8. The two-dimensional optical deflector as set forth in claim 1, further comprising a reinforcement rib made of non-magnetized Nd—Fe—B magnetic material on a rear-side surface of said mirror.

9. The two-dimensional optical deflector as set forth in claim 1, further comprising a spacer interposed between said outer frame and said base.

10. A method for manufacturing a two-dimensional optical deflector comprising:
    forming a mirror, two first torsion bars coupled to said mirror along a first axis, an inner frame surrounding said mirror and said first torsion bars, two piezoelectric actuators each coupled between said first torsion bars and supported by an inner coupling portion of said inner frame, adapted to rock said mirror around said first axis, an outer frame surrounding said inner frame, and two second torsion bars coupled between said inner frame and said outer frame along a second axis perpendicular to said first axis, using a monocrystalline silicon substrate;
    forming a first magnetic layer on a rear-side surface of said inner frame;
    performing a first magnetizing process upon at least a first part of said first magnetic layer to form a first permanent magnet layer; and
    adhering a rear-side surface of said outer frame onto a base including a coil opposing said first permanent magnet layer,
    a magnetic flux generated from said coil interacting with a magnetic flux of said first permanent magnetic layer to rock said mirror around said second axis.

11. The method as set forth in claim 10, further comprising:
    performing a second magnetizing process upon a second part of said first magnetic layer to form a second permanent magnet layer,
    a boundary between said first and second magnetic permanent magnet layers being arranged at said second axis,
    a polarity of a magnetic pole at a rear-side surface of said first permanent magnet layer being opposite to a polarity of a magnetic pole at a rear-side surface of said second permanent magnet layer,
    said coil being adapted to generate a magnetic flux interacting with magnetic fluxes generated from said first and second permanent magnet layers.

12. The method as set forth in claim 10, wherein a boundary between said first permanent magnet layer and a second part of said magnetic layer not subjected to said first magnetizing process is arranged at said second axis or close to said second axis along said second axis, said coil being adapted to generate a magnetic flux interacting with a magnetic flux generated from said first permanent magnet layer.

13. The method as set forth in claim 10, wherein said first permanent magnet layer is formed on the entire rear-side surface of said inner frame, said coil comprising first and second coils separated by said second axis, said first and second coils being adapted to generate first and second magnetic fluxes, whose directions oppose each other interacting with a magnetic flux generated from said first permanent layer.

14. The method as set forth in claim 10, further comprising forming a second magnetic layer on a rear-side surface of said mirror, said second magnetic layer being not subjected to magnetization and serving as a reinforcement rib.

15. The method as set forth in claim 14, further comprising performing a demagnetizing process upon said second magnetic layer.

16. The method as set forth in claim 10, further comprising interposing a spacer between said outer frame and said base.

17. The method as set forth in claim 10, wherein said first magnetic layer comprises Nd—Fe—B magnetic material.

18. The method as set forth in claim 14, wherein said second magnetic layer comprises Nd—Fe—B magnetic material.

19. The method as set forth in claim 10, wherein said base comprises a ceramic package, said coil being buried in said ceramic package.

20. The method as set forth in claim 10, wherein said monocrystalline silicon substrate comprises a bare monocrystalline silicon substrate.

\* \* \* \* \*